(12) United States Patent
Joffe et al.

(10) Patent No.: US 6,978,330 B1
(45) Date of Patent: Dec. 20, 2005

(54) SHARED RESOURCE ACCESS VIA DECLARATIONS THAT CONTAIN A SEQUENCE NUMBER OF A PACKET

(75) Inventors: Alexander Joffe, Palo Alto, CA (US); Asad Khamisy, Fremont, CA (US)

(73) Assignee: Applied Micro Circuits Corporation, San Diego, CA (US)

(*) Notice: Subject to any disclaimer, the term of this patent is extended or adjusted under 35 U.S.C. 154(b) by 514 days.

(21) Appl. No.: 10/117,780

(22) Filed: Apr. 4, 2002

(51) Int. Cl.[7] ............................................. G06F 1/00
(52) U.S. Cl. ..................... 710/240; 710/200; 710/32; 710/34; 710/35; 710/61; 710/118; 711/152
(58) Field of Search ................. 710/200, 240, 710/241–244, 108, 113, 118, 125, 308–311; 709/100–108

(56) References Cited

U.S. PATENT DOCUMENTS

| | | | | | |
|---|---|---|---|---|---|
| 3,905,023 | A | * | 9/1975 | Perpiglia | 714/6 |
| 4,316,245 | A | * | 2/1982 | Luu et al. | 718/106 |
| 4,395,757 | A | * | 7/1983 | Bienvenu et al. | 718/104 |
| 5,339,443 | A | * | 8/1994 | Lockwood | 710/244 |
| 5,469,558 | A | * | 11/1995 | Lieberman et al. | 710/105 |
| 5,515,538 | A | * | 5/1996 | Kleiman | 710/260 |
| 5,790,881 | A | | 8/1998 | Nguyen | 395/800.34 |
| 5,922,057 | A | * | 7/1999 | Holt | 710/52 |
| 6,065,103 | A | * | 5/2000 | Tran et al. | 711/156 |
| 6,128,672 | A | * | 10/2000 | Lindsley | 710/19 |
| 6,173,358 | B1 | * | 1/2001 | Combs | 711/100 |
| 6,237,019 | B1 | * | 5/2001 | Ault et al. | 718/104 |
| 6,330,626 | B1 | * | 12/2001 | Dennin et al. | 710/52 |
| 6,338,108 | B1 | | 1/2002 | Motomura | 710/110 |
| 6,549,961 | B1 | * | 4/2003 | Kloth | 710/36 |
| 6,662,252 | B1 | * | 12/2003 | Marshall et al. | 710/200 |
| 6,665,755 | B2 | * | 12/2003 | Modelski et al. | 710/100 |
| 2002/0186661 | A1 | * | 12/2002 | Santiago et al. | 370/252 |
| 2003/0061443 | A1 | * | 3/2003 | Frank et al. | 711/118 |

OTHER PUBLICATIONS

Office Action dated Feb. 6, 2004, in U.S. Appl. No. 10/117, 779, (8 pages).
Response to Office Action, dated Jun. 1, 2004, in U.S. Appl. No. 10/117,779. (10 pages).
Office Action dated Aug. 25, 2004, in U.S. Appl. No. 10/117,79, (10 pages).
Response to Office Action, dated Dec. 1, 2004, in U.S. Appl. No. 10/117,779. (14 pages).

* cited by examiner

*Primary Examiner*—Paul R. Myers
*Assistant Examiner*—Raymond N Phan
(74) *Attorney, Agent, or Firm*—Silicon Valley Patent Group LLP

(57) ABSTRACT

Logic (also called "re-ordering semaphore") issues semaphore grants to access a shared resource in an order different from the order in which semaphore requests for accessing the shared resource are received. The re-ordering semaphore needs to receive a semaphore release between any two semaphore grants. There is no limit on the duration between a semaphore grant and a semaphore release, so that a task that receives a semaphore grant can use the shared resource for any length of time. In one embodiment, each request is associated with a number indicative of the order in which grants are to be issued, and the re-ordering semaphore uses this number in deciding which request is to be granted. The number can be a sequence number that is indicative of the order of arrival of packets that generated the requests.

22 Claims, 11 Drawing Sheets

|  | Task 0 | Task J | Task M |
|---|---|---|---|
| Request for SA | Enabled | Enabled | Enabled |
| Request for SI | Disabled | Enabled | Enabled |
| Request for SN | Disabled | Disabled | Enabled |

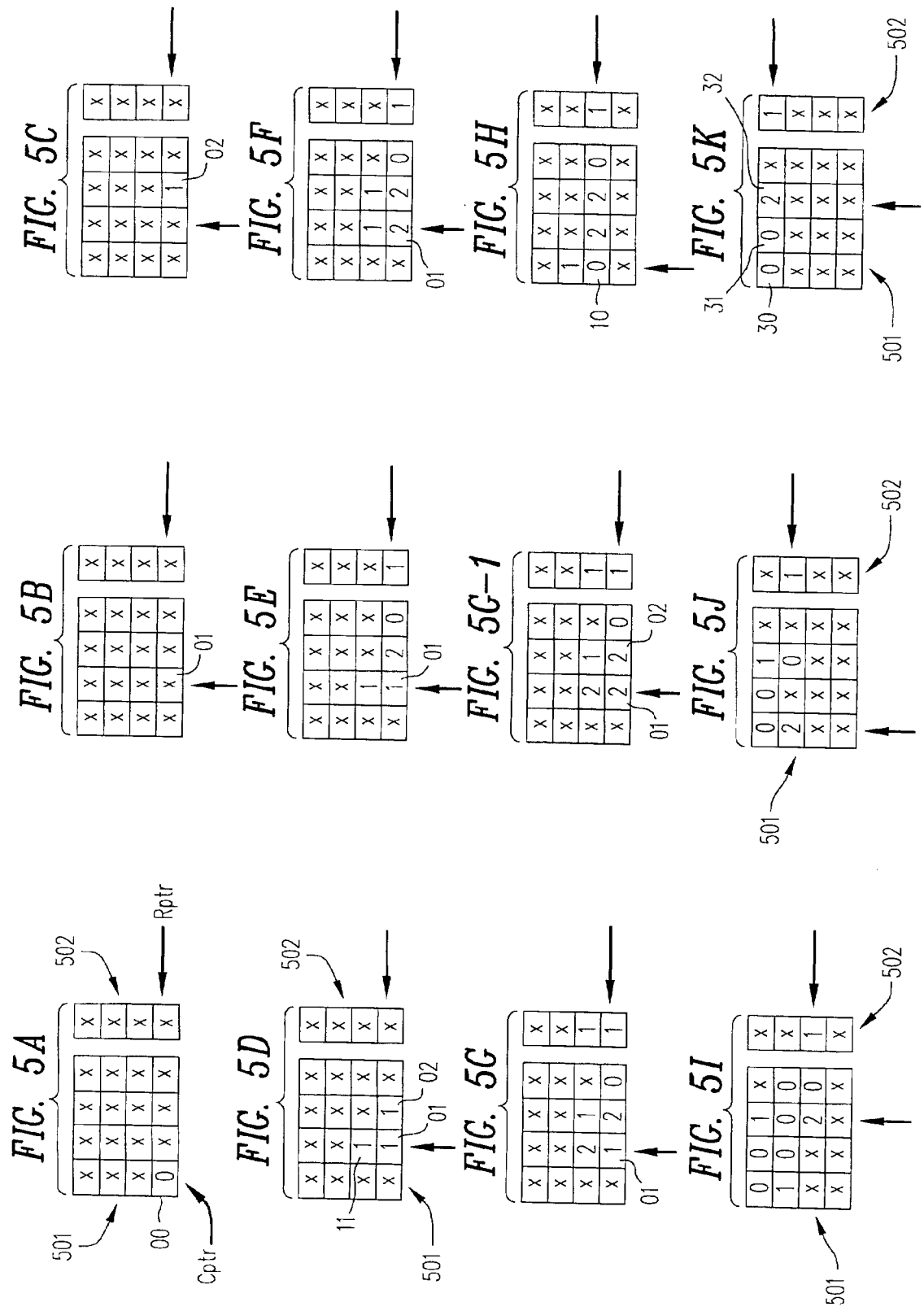

SHARED RESOURCE ACCESS VIA DECLARATIONS THAT CONTAIN A SEQUENCE NUMBER OF A PACKET

CROSS REFERENCE TO RELATED APPLICATIONS

This application is related to and incorporates by reference herein in their entirety the following U.S. patent application(s):

(U.S. patent application Ser. No. 10/103,436 entitled "Dynamic Allocation of Packets to Tasks," Nathan Elnathan et al., filed on Mar. 20, 2002.

(U.S. patent application Ser. No. 10/103,393 entitled "Reordering of Out-of-Order Packets," Nathan Elnathan et al., filed on Mar. 20, 2002.

(U.S. patent application Ser. No. 10/103,415 entitled "Asymmetric Coherency Protection," Ilan Pardo, filed on Mar. 20, 2002.

(U.S. patent application Ser. No. 10/117,394 entitled "Method and Apparatus to Suspend and Resume on Next Instruction for a Microcontroller," Alexander Joffe, filed concurrently herewith.

(U.S. patent application Ser. No. 10/117,452 entitled "METHOD AND APPARATUS FOR ISSUING A COMMAND TO STORE AN INSTRUCTION AND LOAD RESULTANT DATA IN A MICROCONTROLLER," Alexander Joffe et al., filed concurrently herewith.

(U.S. patent application Ser. No. 10/117,779 entitled "Memory Co-processor for a Multi-Tasking System," Alexander Joffe et al., filed concurrently herewith.

(U.S. patent application Ser. No. 10/117,781 entitled "Logic for Synchronizing Multiple Tasks at Multiple Locations in an Instruction Stream," Alexander Joffe et al., filed concurrently herewith.

CROSS REFERENCE TO ATTACHED APPENDIX

Appendix A contains the following files in one CD-ROM (of which two identical copies are attached hereto), and is a part of the present disclosure and is incorporated by reference herein in its entirety:

```
Volume in drive D is 020329_1606
Volume Serial Number is 2AC6-332D
Directory of d:\
03/29/02  04:06p    <DIR>          .
03/29/02  04:06p    <DIR>          ..
03/28/02  02:31p              365,686 MEMCOP.TXT
03/28/02  02:33p              219,262 UCEXEC.TXT
              4 File(s)        584,948 bytes
                                     0 bytes free
```

The files of Appendix A form source code of computer programs and related data of an illustrative embodiment of the present invention.

A uCexec.txt file describes the behavioral model of circuitry in a microcontroller's execution unit to decode and execute an instruction to provide a store-and-load command to a memory co-processor.

A MemCoP.txt file describes the behavioral model of circuitry of the memory co-processor, which is also known as a special processing unit (SPU).

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

A number of tasks (for handling packets) that execute in a microcontroller 20 (see FIGS. 1A and 1B) may take different paths (also called "code paths") depending on the packet, even if such tasks execute the same software program (also called "code") 10. For example, Task0 may make a jump in executing code 10 after performing a first policing function at a location S0, thereby to define a first code path 11. Once Task0 makes the jump, Task0 does not need to perform the remaining policing functions S1 and S2 that are otherwise required during in-line (i.e. no jump) execution of software program 10.

In the example of FIG. 1A, another task, namely Task1 does not jump immediately after location S0 in software program 10, and-instead continues with in-line execution (e.g. executes a number of instructions immediately following location S0). However, Task1 may eventually make a jump after performing a second policing function at a location S1 in the software program 10, thereby to define code path 12. In a similar manner, Task2 may simply execute software program 10 without making any jumps immediately after locations S0 and S1, thereby to define code path 13.

In the example being discussed, at various locations in the respective code paths, a decision to make a jump depends on the value of data that is shared among such tasks, Task0–Task2. For example, in a networking application, the policing functions performed at locations S0 and S1 may require that a packet that is being processed be dropped, for example if the rate exceeds a predefined bandwidth allocated to a channel to which the packet belongs.

Therefore, it is important for such tasks, Task0–Task2 to ensure that the data being used in the policing functions is accurate and updated properly. Access to such data may be arbitrated by use of a semaphore as a synchronization mechanism, to access a common location in memory, to ensure that data at that common location is not changed by one task while that data is being used by another task. Use of such a semaphore ensures, for example, that a packet counter is properly incremented (or a database entry is properly accessed) by each of a number of tasks that execute concurrently or simultaneously in the microcontroller.

Certain conventional semaphores treat all tasks equally, and process requests from the tasks in a first-in-first-out manner. Therefore, when tasks Task0–Task3 request a semaphore in sequence, their requests are granted in the same sequence.

In using such a semaphore, when one task, e.g. Task0 in FIG. 1B, is accessing a memory location at a location S0 in the code, other tasks, e.g. Task1, Task2, and Task3, that also need to access that same memory location are suspended (i.e. are made to wait). While such other tasks are waiting, Task0 may be activated from sleep, may issue a read request on being awakened, may again be put to sleep while waiting for a response from memory, may again be awakened on receiving the memory response, perform a read operation, and finally release the semaphore. Only at this point is the semaphore for code location S0 available for use by the next task, Task1.

Such a semaphore's processing of requests from tasks Task0–Task3 does not take into account the fact that the packet being handled by Task3 may have arrived before the packet being handled by Task0.

U.S. Pat. No. 5,790,881 granted to Nguyen on Aug. 4, 1998 entitled "Computer system including coprocessor devices simulating memory interfaces" suggests (see abstract) "coupling a coprocessor to a master device, in which the coprocessor emulates an memory interface to the master device, like that of a memory device. . . . The coprocessor is disposed to receive data written from the master device, perform a coprocessing function on that data, and respond to a read data command from the master device with processing results."

See also U.S. Pat. No. 6,338,108 granted to Motomura on Jan. 8, 2002 entitled "Coprocessor-integrated packet-type memory LSI, packet-type memory/coprocessor bus, and control method thereof" which states (see abstract) that "[a] memory section and coprocessor sections in a coprocessor-integrated packet-type DRAM are provided with unique memory device ID and coprocessor device IDs respectively . . .".

SUMMARY

The present invention relates to logic (also called "re-ordering semaphore") that implements a semaphore while re-arranging requests (for access to a shared device) in an order specified by tasks that generate the requests, regardless of the order in which the requests are made. In some embodiments, the tasks specify a number (also called "sequence number") that is indicative of, for example, the order of arrival of packets that are being handled by the tasks, and in such embodiments the logic is called "sequencing semaphore." In other embodiments, the tasks may specify, for example, a priority according to which their semaphore requests are to be granted, and in such embodiments the logic is called "prioritizing semaphore."

Therefore, regardless of the order in which the semaphore requests are received, grants are made to the tasks in accordance with the invention only in an order specified by the tasks (e.g. in the order of increasing sequence number). Hence, even if it is the turn of a task to use the shared resource and this task has not yet generated a semaphore request, all other semaphore requests are kept waiting until this task either declares that it won't use the shared resource or in fact uses the shared resource. Note that as in the normal manner, the task generates a semaphore request preceding the use of shared resource and generates a semaphore release following the use of the shared resource.

In one embodiment, a re-ordering semaphore maintains in a local memory the state of each semaphore request received from each task. Moreover, the re-ordering semaphore maintains a pointer to a current task whose turn it is to use the shared resource. The pointer is kept fixed from the time a semaphore grant is sent till the time a semaphore release is received. Moreover, the pointer is incremented only if a task has declared that it doesn't use the shared resource, or if the task has completed usage of the shared resource.

BRIEF DESCRIPTION OF THE DRAWINGS

FIGS. 5A–5K and 5G-1 illustrate exemplary transitions that occur in a synchronization request array of the type illustrated in FIG. 2B.

DETAILED DESCRIPTION

Figures 2A, 2B:
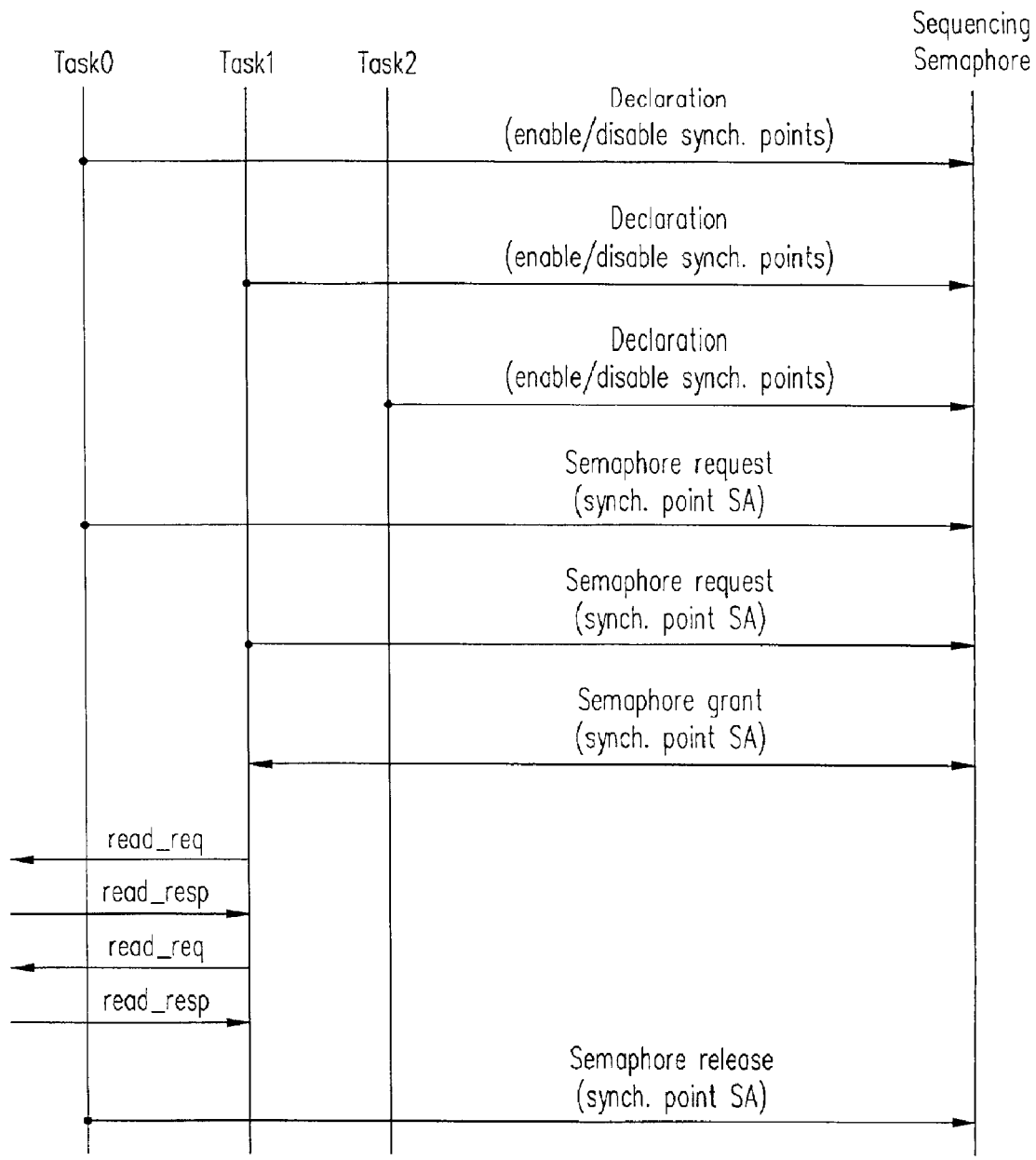
FIG. 2A illustrates each task issuing a "declaration" signal in accordance with the invention, to a sequencing semaphore, followed by issuance of a semaphore request.
FIG. 2B illustrates a table of states maintained in accordance with the invention for use in granting semaphore requests

In accordance with the invention, on startup or a short time thereafter prior to accessing any shared data, a number of tasks Task0–TaskM (wherein $0 \leq J \leq M$, M being the total number of tasks) issue signals (called "declarations") to a logic (called "re-ordering semaphore") as illustrated in FIG. 2A, to identify whether or not the tasks expect to access a shared resource at certain predefined synchronization points SA-SN (wherein $A \leq I \leq N$, N being the total number of synchronization points) in their instruction streams. If a semaphore request for the shared resource is expected at synchronization point SA, then this synchronization point SA is indicated (in the task's declaration) as having a state "enabled" and otherwise indicated as having the state "disabled".

The re-ordering semaphore receives such state signals from each task "TaskJ", for each synchronization point "SI", and stores the state locally in a buffer (e.g. in a two-dimensional table as illustrated in FIG. 2B). The re-ordering semaphore uses the states in deciding whether or not to allow an instruction from a task to access the shared resource. When a semaphore request from a task is received for any specific synchronization point SI, the re-ordering semaphore changes a state associated with the task from "enabled" to "pending."

If a task's state is "pending" and if it is now this task's turn, then the re-ordering semaphore issues to this task a semaphore grant. In the example shown in FIG. 2A, Task1 has received a grant although Task0 had generated the semaphore request first, which can happen e.g. if the packet being handled by Task1 arrived before the packet being handled by Task0 and the order is identified by a sequence number. Alternatively, Task1 may have a higher priority than Task0, and for this reason Task0 is kept waiting until after Task1 has completed its use of the shared resource.

The re-ordering semaphore of some embodiments maintains a current pointer for each synchronization point SI, and this current pointer indicates which task's semaphore request (for accessing the same shared resource) is to be now granted. If the current pointer points to a task that has not yet provided a semaphore request and if the state of the task's sequence number is "enabled" or "invalid", then any semaphore requests from other tasks are made to wait until the current task's semaphore request is received, a semaphore grant is sent back, and a semaphore release is received. If for some reason a task does not expect to issue a semaphore request (e.g. as indicated in its declaration), then the current pointer is incremented (or otherwise changed, e.g. based on an incremented sequence number) to identify a next task that is then made current for this synchronization point SI.

If a semaphore request is received from a task TaskI for a specific synchronization point SJ, and if the current pointer for this synchronization point SJ is pointing to TaskI, then that semaphore request is immediately granted. Moreover, the current pointer is kept fixed (i.e. not incremented or increased to point to the next task) until a semaphore release is received from task TaskI.

Specifically, in one implementation, the increment (or increase) of a current pointer is under the control of the tasks, e.g. depends on a specific signal from the task whose turn it is to use the shared resource. The just-described signal (also called "lock current pointer" signal) may be activated by any task at the time of issuance of a semaphore request, to allow any number of instructions from the task to be executed for the current synchronization point SJ, prior to execution of an instruction from another task.

Use of such "lock current pointer" signal (and an inverted version of this signal is called "update sequence number" signal) allows a task to have a critical section of any length simply by keeping the "lock current pointer" signal active, thereby implementing a semaphore function. A task that doesn't need a critical section (e.g. if only one instruction is to be executed on the shared resource), then the task simply changes the "lock current pointer" signal to inactive, which causes the current pointer to be incremented, so that another task's semaphore request can be processed (or its instruction executed).

Therefore, in one embodiment, a re-ordering semaphore is implemented as a portion of a logic (called synchronizing logic) that handles not only semaphore requests but also handles commands to perform, e.g. read-modify-write instructions on data held in shared memory. The synchronizing logic can handle both states of the "lock current pointer" signal, and therefore implements the re-ordering semaphore. For more details on the synchronizing logic, see the related U.S. Patent Application Ser. No. 10/117,781, that has been incorporated by reference above.

Figure 3A:
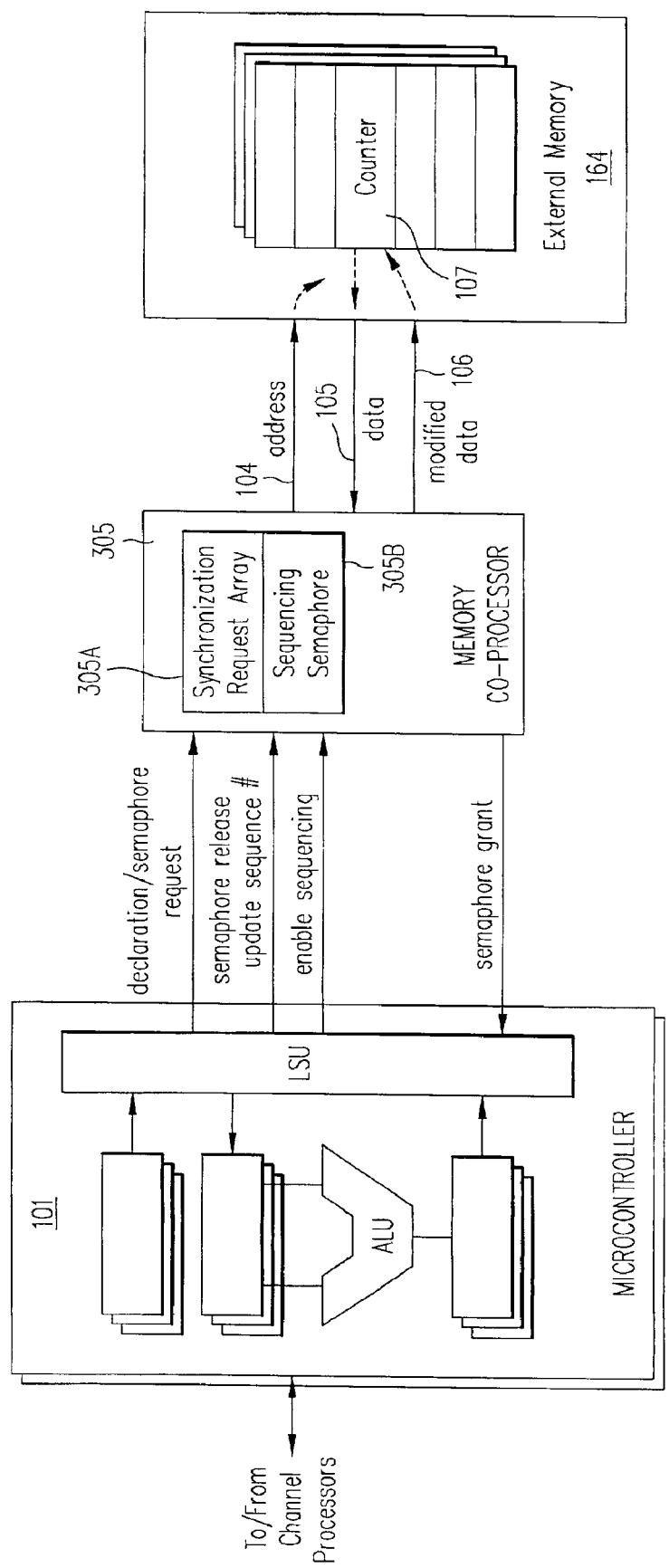
FIG. 3A illustrates, in a block diagram, use of a memory co-processor to interface a microcontroller to external memory, in accordance with the invention.

In one specific embodiment, a re-ordering semaphore selectively provides access to shared data among multiple tasks that execute in a microcontroller 301 (FIG. 3A), such as a network processor. Microcontroller 301 is coupled to and controls the operation of one or more channel processors that process packets and/or cells, as described in, for example, U.S. Pat. No. 6,330,584 granted to Joffe that is incorporated by reference herein in its entirety. Each of the channel processors assigns a sequence number to each packet according to their order of arrival, and the sequence number along with a pointer to the packet is supplied to microcontroller 301.

The sequence number being assigned to each packet may be any monotonically changing number (e.g. a number that is incremented or decremented by 1 for each packet arrival), and depending on the embodiment the sequence number is unique globally across all channel processors or alternatively the sequence number is unique only within a channel processor (or only in one direction of one channel processor).

On receipt of a packet pointer and its associated sequence number, microcontroller 301 assigns the packet to a task executing therein (an assignment may be performed by, for example, a request unit). The task generates a declaration followed by one or more instructions to the co-processor, to access a shared resource. The just-described signals generated by a task are handled by a re-ordering semaphore which is hereinafter referred to as a sequencing semaphore, because it uses sequence numbers in deciding the order of access.

A sequencing semaphore of the type described herein can be implemented off-chip, i.e. outside of microcontroller 301 in which various tasks are executing. In one such embodiment illustrated in FIG. 3A, a sequencing semaphore 305B is implemented in hardware in a separate co-processor 305 that is used in one embodiment to access external memory (as described in, for example, U.S. Patent Application Ser. No. 10/117,779, concurrently filed herewith and incorporated by reference above). Alternatively, a sequencing semaphore of the type described herein can be implemented on-chip, i.e. inside microcontroller 301 in which various tasks are executing.

In one embodiment, a memory co-processor 305 (FIG. 3A) includes, in addition to sequencing semaphore 305B, a number of buffers 305A in which are stored tables 305A (of the type described above; also called "synchronization request arrays"). There is one table among tables 305A for each synchronization point S0–SN. As noted above, multiple tables 305A identify the state of access of shared data by various tasks (which in this example are identified by sequence numbers, because each task is assigned to a sequence number and works on a packet of that sequence number).

Each table 305A holds the state of a group of (e.g. all) sequence numbers that identify which one of the tasks currently needs to supply a command to memory co-processor 305. When a task has either indicated no need to access the shared data or the task's instruction (such as a read-modify-write instruction) to change the shared data has been executed, the sequence number is incremented (assuming the "update sequence number" signal is enabled with the read-modify-write instruction), after setting the synchronization point's state for the current sequence number (prior to incrementing) to "invalid".

Figure 1A:
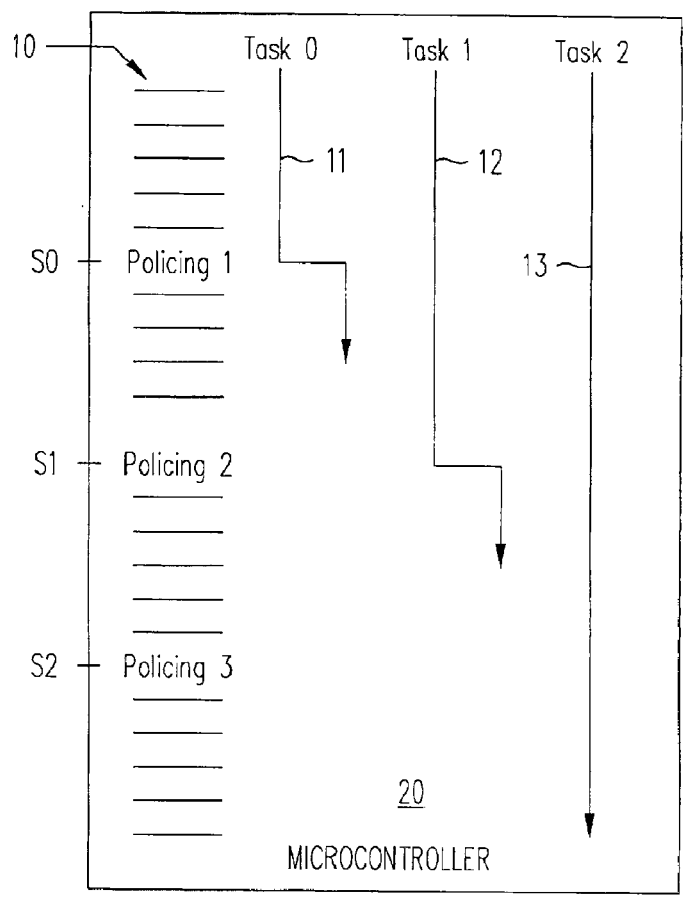
FIGS. 1A and 1B illustrate code paths of tasks in the prior art, wherein the tasks need to synchronize their access to shared data at various synchronization points.
Figure 1B:
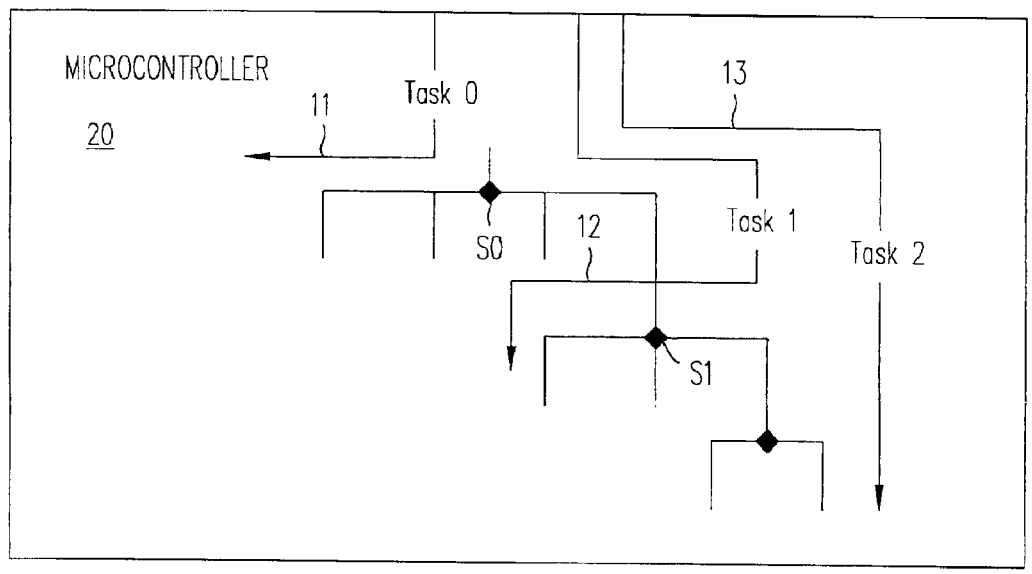
Figure 3B:
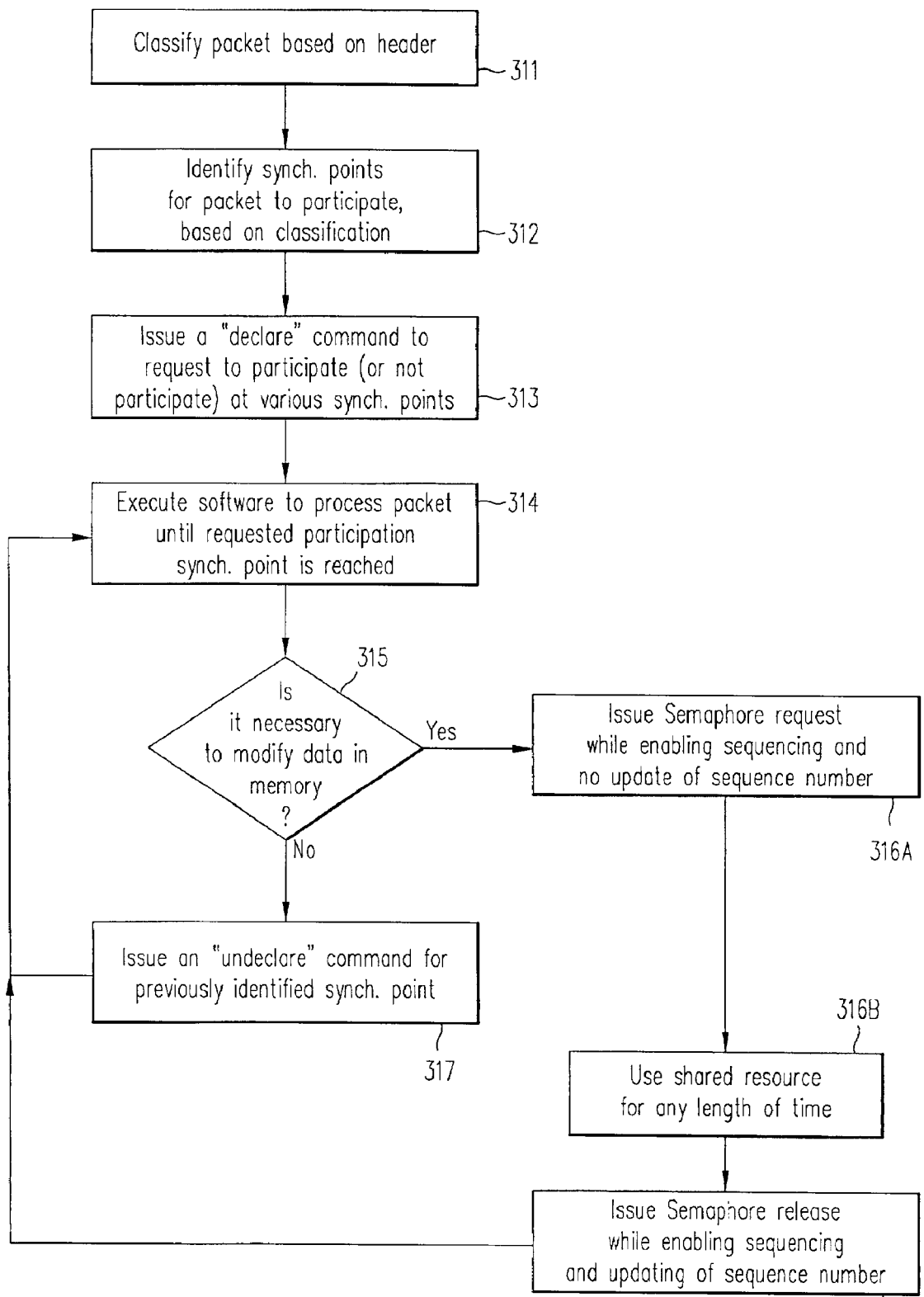
FIG. 3B illustrates, in a flow chart, acts performed by a task in a microcontroller for accessing shared data in one embodiment.

Soon after startup, each task compares one or more items of information in its packet header to predetermined values, thereby to classify the packet (see act 311 in FIG. 3B). Next, the task identifies (see act 312) synchronization points at which processing of the packet is likely to access data shared with other tasks, e.g. at points S0, S1 and S2 illustrated in FIGS. 1A and 1B. For any given software program, synchronization points are known ahead of time, based on packet type.

Next, the task issues (see act 313 in FIG. 3B) a "declare" command to a sequencing semaphore. In some embodiments, each "declare" command identifies, in addition to predefined synchronization points, an identifier of the task that processes the packet (as per FIG. 3C; also see bus 302 in FIG. 3A).

After issuing a declare command, each task simply continues, e.g. executes software to process the packet (see act 314 in FIG. 3B), until a synchronization point is reached.

When a synchronization point is reached, each task goes to act 315 (FIG. 3B) to check if it is necessary to use the shared resource. Under normal circumstances, this is true, and therefore the task goes to act 316A to issue a semaphore request. When issuing the semaphore request, the task drives two signals active: (1) lock current pointer and (2) enable sequencing.

After issuing the semaphore request, the task becomes suspended until a semaphore grant is returned. A semaphore grant may be provided by a sequencing semaphore at any time, depending on which other tasks have declared a need to use the shared resource, and the status of their usage (e.g. if all tasks with a lower sequence number than the current task have completed usage of the shared resource (or declared no need to use), then a semaphore grant is likely to be returned without delay; on the other hand if one or more tasks with lower sequence numbers has indicated need to use and has not yet used then the grant is delayed until one of these conditions is met).

Once a grant is received (see act 316B in FIG. 3B), the task is awakened and uses the shared resource, for any length of time, simply by keeping two signals active: (1) lock current pointer and (2) enable sequencing. On finishing its use of the shared resource, the task issues a semaphore release (see act 316C in FIG. 3B), while making the enable sequencing signal active, but making the. lock current pointer signal inactive. Thereafter, the task returns to act 314 (described above).

A task may go to act 317 (from act 315), e.g. if on performance of a policing function it is decided to drop the packet being processed. If so, the task declares a change in expectation, about not needing to use shared resource at one or more synchronization points that were previously marked "enabled".

A sequencing semaphore (FIG. 3C) receives each instruction issued by each task, and uses a buffer (of the type described above in reference to FIG. 2B) to determine the action to be taken. For example, sequencing semaphore temporarily stores each instruction in a buffer (also referred to as an "out of sequence" buffer), unless the following two conditions are met: (1) the task is currently enabled to access the shared data for this synchronization point and (2) it is now the current task's turn (as noted above in reference to FIG. 2B) to access the shared data.

Figure 3C:
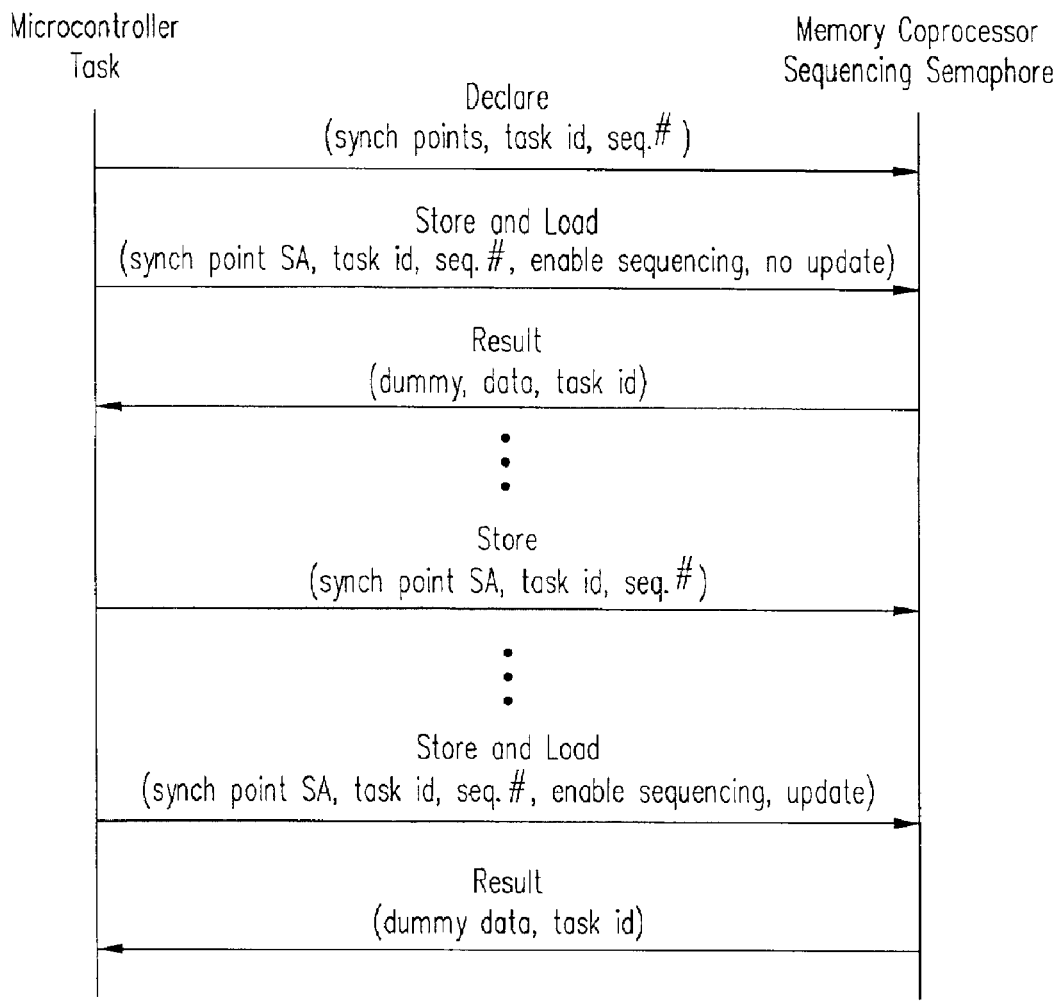
FIG. 3C illustrates, in a timing chart, a sequence of events when a task accesses a specific shared resource in one embodiment.

In one example, the signals exchanged between a microcontroller-based task and coprocessor-based sequencing semaphore are illustrated in FIG. 3C. Specifically, in this example, a task first assembles and issues a declare command for each of a number of synchronization points that it expects to encounter when processing the just-received packet. In the declare command, the task provides an indication of which synchronization points are to be enabled, the task identifier and a sequence number).

Thereafter, the task assembles and issues a command to request a semaphore for the shared resource needed at a first synchronization point SA. The issued command may be, for example, a "store-and-load" command (of the type discussed in the related U.S. Patent Application, incorporated by reference above), and the memory co-processor returns a result to the microcontroller, indicating, for example, that the semaphore is granted. When providing a store-and-load command, the task identifies a specific synchronization point SA, the task's identifier, sequence number, enable sequencing signal and no update sequence number signal.

In the result signal, the memory co-processor identifies the task that issued the command. In such a result (which indicates a semaphore grant) the data is just dummy data (e.g. all zeros) because the shared resource has not in fact been accessed yet.

Thereafter, the task can use the shared resource, e.g. by issuing any number of store-and-load commands or alternatively store commands. And in some examples, a number of such store commands are issued, one after another, in a back-to-back fashion (i.e. the task doesn't need to wait for memory latency, and instead obtains the highest throughput by use of the memory co-processor to do the actual memory access).

Figure 4A:
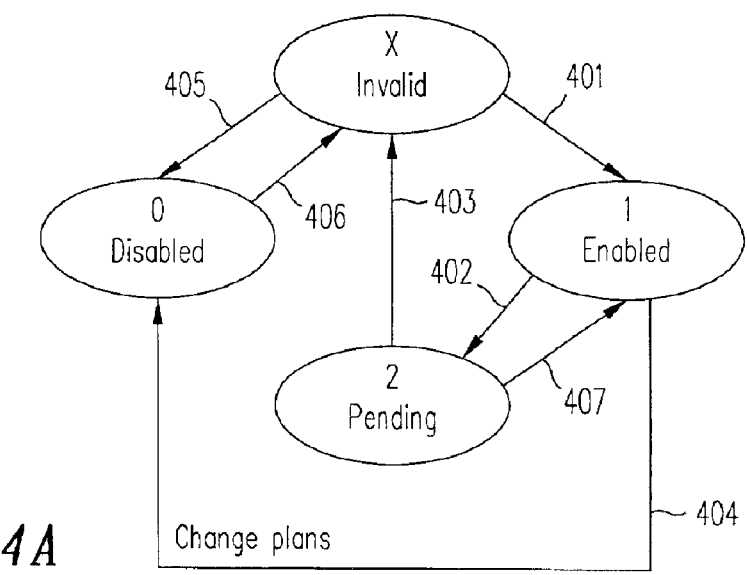
FIG. 4A illustrates, in a state diagram, transitions between various states of each task in accessing shared resource in one embodiment.

On receipt of a declare command identifying a particular synchronization point SI as being "enabled", the sequencing semaphore changes a value in the above-described table from "invalid" (which is a default value) to "enabled", as illustrated by branch 401 (FIG. 4A). Thereafter, when the sequencing semaphore receives a store-and-load (or store) command, the sequencing semaphore changes an "enabled" value in the table to "pending" (as illustrated by branch 402). When a task's command has been executed, the sequencing semaphore changes a "pending" value in the table to "invalid" (as illustrated by branch 403). Note that when the state is "pending" if the update sequence number signal is inactive, then the state changes to "enabled" (see branch 407), so that a task may make another access to the shared resource.

When a task indicates its change in expectation, about not needing to use shared data at one or more synchronization points that were previously at the state "enabled", the sequencing semaphore changes an "enabled" state in the table to "disabled" (as illustrated by branch 404). Branch 404 is only a unidirectional branch, meaning that a state "disabled" is not to be changed to "enabled". A task may also indicate at the inception that it does not expect to participate in changing data at a specific synchronization point, and in this case, the sequencing semaphore changes an "invalid" state in the table to "disabled" (as illustrated by branch 405).

The sequencing semaphore changes a "disabled" state in the table to "invalid" (as illustrated by branch 406) when incrementing the sequence number (beyond the sequence number for the current task). The sequencing semaphore never changes an "enabled" state in the table to "invalid".

Figure 4B:
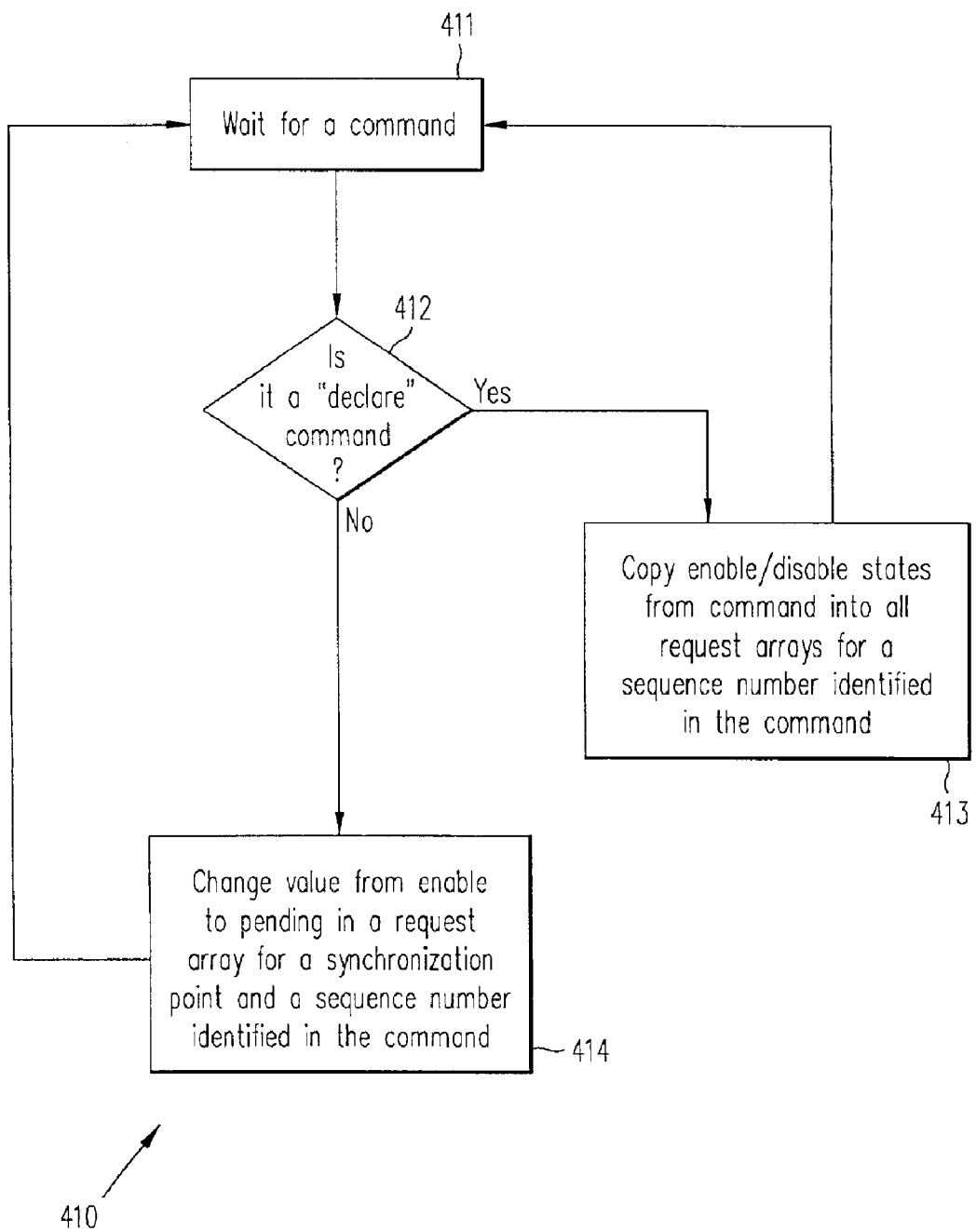
FIGS. 4B and 4C illustrate, in flow charts, acts performed by a sequencing semaphore of one embodiment.
Figure 4C:
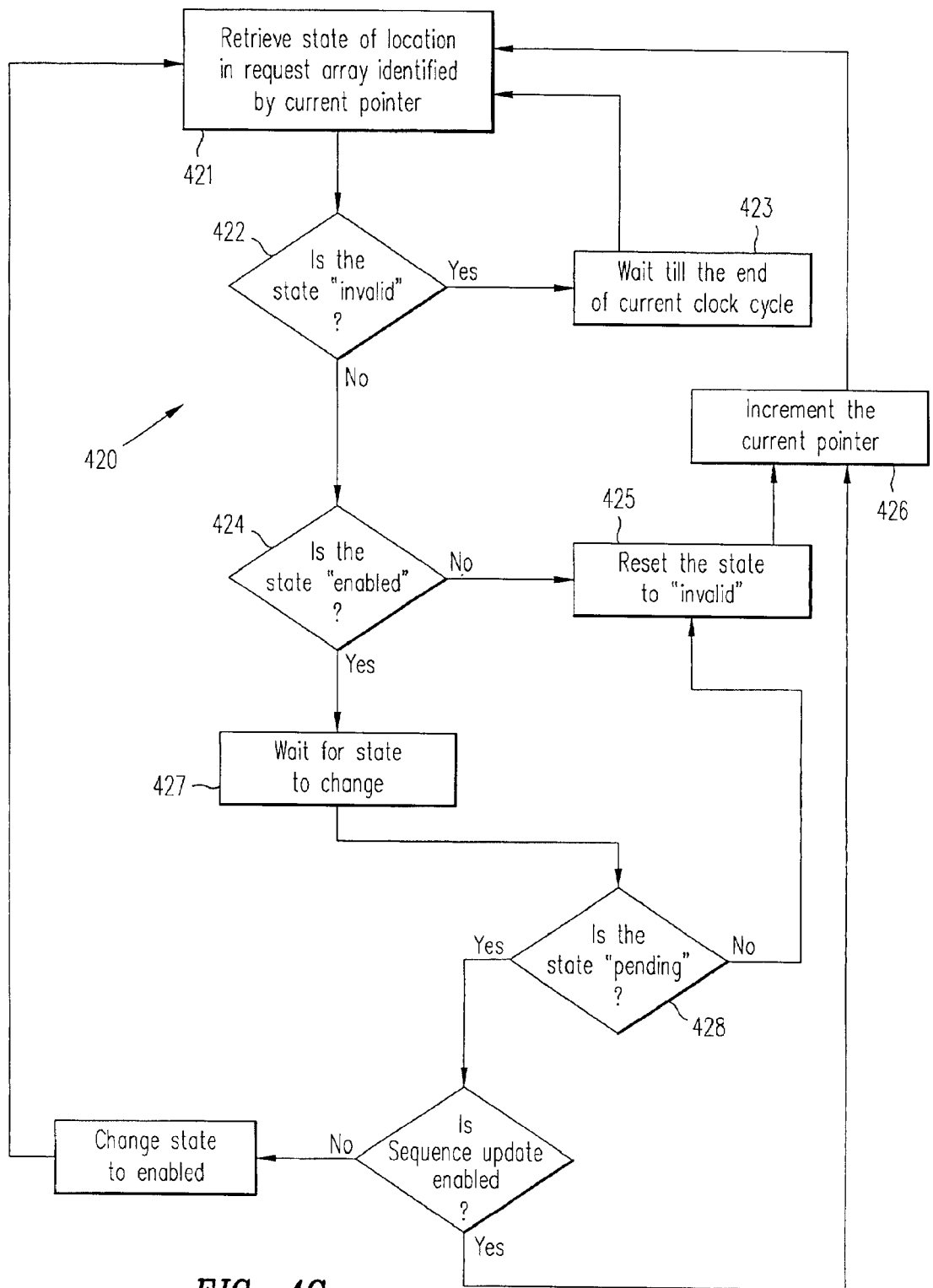

In one embodiment, the sequencing semaphore is implemented by a number of processes that execute in parallel with one another. Specifically, one process 410 (illustrated in FIG. 4B) receives and handles all commands from the various tasks, while other processes 420 (illustrated in FIG. 4C) issue to an execution unit, instructions received from these tasks if so indicated by the state of each task. Therefore, in this embodiment, a single process handles all commands, for all synchronization points (i.e. for all request arrays).

Initially, process 410 simply waits for a command (as per act 411), and on receipt of a command from a task in a microcontroller, goes to act 412 to check if the command was a "declare" command. If so, process 410 goes to act 413 to copy enable/disable states for this task from the command into all request arrays (for all synchronization points), and thereafter returns to act 411.

If in act 412 the command received is not a declare command, then the command contains an instruction for changing the shared data (such as a store-and-load instruction or a store instruction). If so, process 410 goes to act 414 and changes a state value of a location in the request array corresponding to the task that generated the command (e.g. for a specific sequence number), for the current synchronization point from "enable" to "pending", and thereafter returns to act 411.

As noted above, a number of processes 420 (FIG. 4C) execute in the sequencing semaphore, one for each request array. Specifically, the sequencer retrieves in act 421 the state of a location (in the request array) that is identified by the current pointer. If the retrieved state is "invalid" (see act 422), then the sequencer simply returns to act 421 (after the current clock cycle has completed). If the state is not "enabled" (see act 424), the sequencer simply resets the state to "invalid" (see act 425), and then increments the current pointer (see act 426), and returns to act 421.

If the state is "enabled" then the sequencer waits for the state to change (see act 427), and this may take several clock cycles, depending on the code path of a task (associated with the current location in the request array). When the state changes, the sequencer checks (in act 428) if the state is "pending" and if not, goes to act 425 (discussed above). If the state is not "pending" then the sequencer returns dummy data to the microcontroller. This dummy data (e.g. all zeros) is not used in the microcontroller, however the signal is used to awaken the task that issued the semaphore request, so that the task can now use the shared resource. Then the sequencer checks if the sequence number update is enabled and if so, it goes to act 426. Else, it changes the state to "enabled" and goes to act 421 afterwards.

FIG. 5A illustrates two arrays: (1) a two-dimensional array 501 (which is 4×4 in size in this example) that functions as a synchronization request array for a specific synchronization point (e.g. the first synchronization point S0) and (2) a one-dimensional array 502 (which is 1×4 in size in this example) that is used to navigate to the next location in array 501, as discussed below.

In FIG. 5A, array 501 has a row pointer Rptr pointing to the bottom-most row and a column pointer Cprt pointing to the left-most column, so that the two pointers together point to a first location in array 501, in column 0, row 0, which is labeled as "00". All sequence numbers that are possible in this example are mapped to one of the locations in array 501. For example, the sequence numbers may be mapped sequentially from left to right in the bottom row, followed by left to right in the row adjacent to the bottom row and so on (with the top right corner location of array 501 representing the largest possible sequence number).

In one example, a task that processes a packet with sequence number 0 does not expect to change the data (at the first synchronization point S0), and for this reason the "00" location in array 501 is initially set to value "0" which indicates "disabled" state (e.g. as a result of a "declare" command). The sequencing semaphore resets the value in the first location "00" of array 501 to the value "x" which indicates "invalid" state, and moves the column pointer to point to the next column on the right (see FIG. 5B). Note that the row pointer remains the same until the column pointer reaches the right-most location of array 501.

The sequencing semaphore notes that the second location "01" of array 501 is currently set to value "x" and therefore, a declare command has not yet been received (see FIG. 5C) from a task with sequence number 1, for the first synchronization point S0. At some time, a declare command from a task with sequence number 2 is received, and the value "1" received therefrom is loaded into array 501, in the location "02". Next, a declare command from a task with sequence number 5 is received (for the first synchronization point S0), and the value "1" received therefrom is loaded into array 501, in the location "11". Then, at a later time, a declare command from a task with sequence number 1 is received (for the first synchronization point S0), and the value "1" received therefrom is loaded into array 501, in the location "01", as shown in FIG. 5D.

Next, a "store-and-load" command is received for the first synchronization point S0, from a task with sequence number 2. So the sequencing semaphore loads the value "2" into array 501 (see FIG. 5E), in the third location "02". Since it is not yet the turn of sequence number 2 (because the current pointer is still pointing to the second location "01" of array 501), the sequencing semaphore simply places the received command in a buffer (called "out-of-sequence" buffer).

An out-of-sequence buffer which is used may be, for example, dedicated to holding instructions only for the first synchronization point S0 (so that there are multiple such buffers, one for each synchronization point), although a larger buffer to hold instructions for all synchronization points, may be used in other embodiments. In view of this disclosure, the to-be-executed instructions being held in out-of-sequence buffers may be handled in a manner similar or identical to the prior art handling of "flows" of packets.

Thereafter, at some point, a task that handles the packet with sequence number 1 issues a "store-and-load" command (for the first synchronization point S0). As a result, the sequencing semaphore loads the value "2" into array 501 (see FIG. 5F), in the second location "01". Since the current pointer is also pointing to the second location "01", it is now the turn of the task with sequence number 1. Therefore, the sequencing semaphore immediately passes an instruction in the just-received command for execution by an execution unit in the memory co-processor. For details on the memory co-processor, see the related U.S. Patent Application Ser. No. 10/117,779, concurrently filed herewith and incorporated by reference above.

After supplying the instruction to the execution unit, the sequencing semaphore changes the value in the second location "01" of array 501 (see FIG. 5F) to the value "2" which indicates "invalid" state. Moreover, at this stage both the column pointer and row pointer remain stationary if no "update sequence number" signal was received.

To recapitulate, at this point, the current pointer is pointing to a location "01" of array 501, with value "2" which means an instruction is pending (e.g. in the out-of-sequence buffer). The sequencing semaphore sends this instruction for execution, and changes the value to "1" to indicate that this sequence number has been now processed for the first synchronization point S0. The state change from "2" to "1" occurs due to the transition along branch 407 (FIG. 4A), which happens because no "update sequence number" signal was received.

At this time, the current pointer continues to point to location "01" of array 501 (see FIG. 5G). Therefore, a task that handles the packet with sequence number 2 can issue another command (such as "load", "store" or other such commands), again with no "update sequence number" signal. As shown in FIG. 5G-1, the value is changed to "2", which means an instruction is pending. In this manner, the just-described task may issue any number of commands. Eventually, when the "update sequence number" signal becomes active, the current pointer transitions to the next location "02" in array 501, which also has value "2" which means an instruction is pending. After this instruction is executed, the next location for the current pointer is location "03".

At this point (FIG. 5H), the sequencing semaphore notes that location "03" has value "0" (meaning "disabled"), and changes this to value "x". Then sequencing semaphore moves the current pointer up to the next row, to location "10" (which represents sequence no. 4). Since the value for location "10" is "0" (meaning "disabled"), the sequencing semaphore changes this to value "x" and moves the pointer by one location to the right (not shown).

The location "11" (which represents sequence no. 5) has a value "2" which means an instruction is pending (e.g. in the out-of-sequence buffer), and the sequencing semaphore supplies this instruction to the execution unit, changes this location to value "x" and moves the pointer by one location to the right (see FIG. 5I).

At this stage, the pointer is pointing to the location "12", which has a value "2" indicating that an instruction is pending (e.g. in the out-of-sequence buffer). Again, the sequencing semaphore supplies this instruction to the execution unit, changes this location to value "x" and moves the pointer by one location to the right (not shown). The location "13" has value "0" thereby to indicate this sequence number is "disabled" and therefore the value is changed to "x" and the pointer is moved up the the next row (see FIG. 5J).

In a similar manner, the upper-most row is eventually reached as illustrated in FIG. 5K, and the first two locations "30" and "31" are skipped because of the value "0" indicating that these sequence numbers are "disabled" and these values are changed to "x". The pointer now points to the location "32" which has a "pending" instruction which is thereafter executed, thereby to yield the array illustrated in FIG. 5L.

In the above-described manner, whenever the sequencing semaphore receives a command from a task, it identifies and updates an appropriate array 501 associated with the specified synchronization point and sequence number. The sequencing semaphore also (independently in one embodiment) evaluates the value at a location identified by the current pointer, and moves the current pointer if appropriate.

Some embodiments sequentially increment a row pointer until the right-most location of array 501 is reached. However, in other embodiments combinational logic is used to determine the next state to be processed, hence skipping a number of disabled states. Also, in some embodiments, another array 502 (also called "navigation array") is used to identify the next row that has a location to be evaluated (e.g. all intermediate rows in which all locations are disabled are skipped).

Specifically, in one embodiment, an entire row of array 501 is read simultaneously (in hardware). Values in the row are simultaneously evaluated by combinational logic, and as a result of evaluation, the row may be updated (e.g. by changing the state to "invalid") if execution is to proceed to another row. Also as a result of evaluation navigation array 502 may be updated.

The evaluation result can have one of the following three values: value 0 if all locations in a row are "disabled" (in which case this row in array 501 will be completely skipped by the synchronizing sequencer when issuing instructions to the execution unit), value 1 if at least one location in the row is "pending" (in which case the synchronizing sequencer will read the row and possibly issue an instruction; issuance of an instruction can happen under the following two conditions (1) if no intermediate sequence number is "enabled" i.e. waiting to become "pending" or "invalid" and (2) if no intermediate sequence number is "invalid" i.e. waiting for state to become "enabled" or "disabled"), and value x if all locations in a row are not disabled and there is no instruction pending (in which case the synchronizing sequencer may not even read the row).

Therefore, in a single clock cycle, the sequencing semaphore skips one or more rows that do not have relevant values. The sequencing semaphore also avoids processing a row that doesn't have any pending instruction.

The number of locations in a row of array 501 is limited only by the number of values that can be evaluated in a single clock cycle, e.g. evaluating 32 values needs more time than evaluating 16 values (e.g. 8 nanoseconds may be required for 16 values to be evaluated). In one. specific implementation, array 501 is 16×16 in size, with 2 bits of value per location.

Figure 6A:
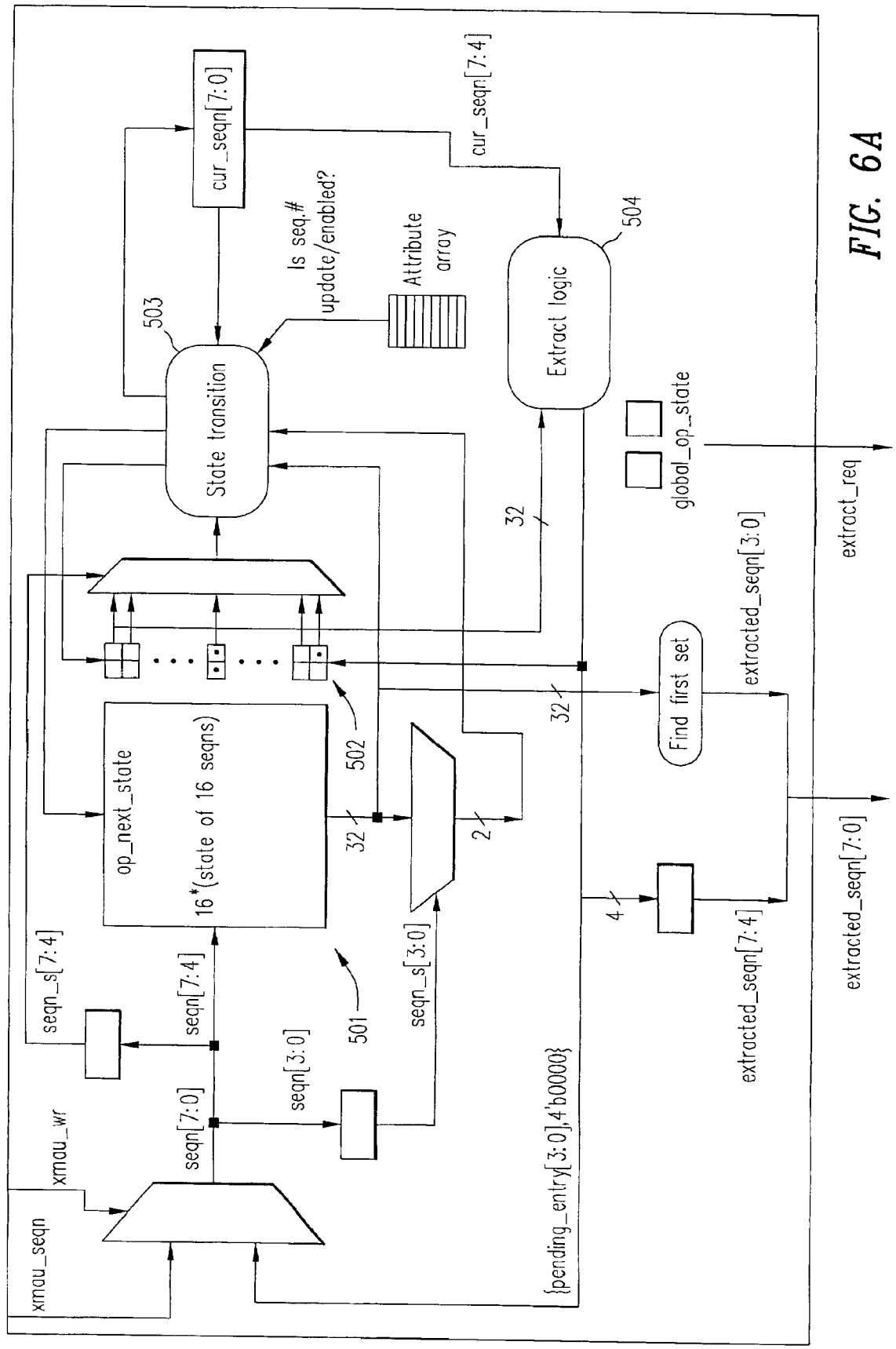
FIG. 6A illustrates, in a block diagram, circuitry for a single synchronization point used to identify a sequence number of an instruction to be executed in one embodiment.

FIG. 6A illustrates, in a block diagram, circuitry (also called "synchronizer element") for a single synchronization point used to extract a sequence number indicative of a pending instruction to be executed, from a request array 501, using a navigation array 502 (both arrays are illustrated in FIGS. 5A–5L).

The synchronizer element of FIG. 6A also includes combinational circuitry 503 to implement state transitions, as described above in reference to, for example, FIG. 4A. Note that the circuitry 503 receives as input a signal stored in an attribute array, namely an update sequence number signal. The attribute array is initialized with this signal and other such signals on receipt of a command from the microcontroller.

The synchronizer element of FIG. 6A further includes circuitry 504 to perform the process described above in reference to, for example, FIG. 4C.

Also illustrated in FIG. 6A are various combinational logic elements and storage elements to perform various acts of the type described in general herein and in detail in the files of Appendix A. The files uCexec.txt and MemCoP.txt in Appendix A (which is attached hereto as a CD-ROM appendix) form source code of computer programs and related data of an illustrative embodiment of the present invention, and these files are incorporated by reference herein in their entirety.

Figure 6B:
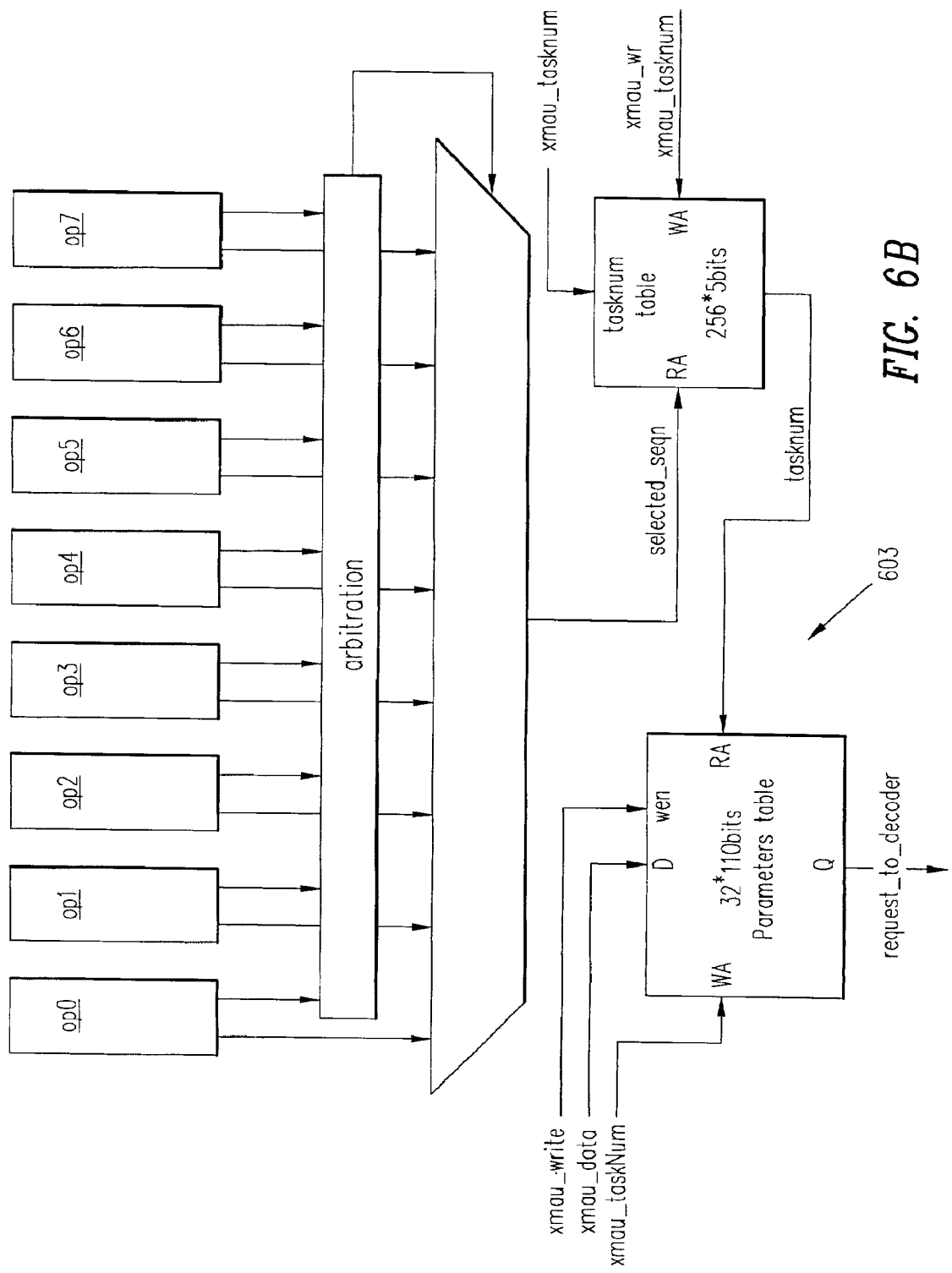
FIG. 6B illustrates, in a block diagram, replication of the circuitry of FIG. 6A to implement a number of synchronization points in accordance with the invention.

FIG. 6B illustrates, in a block diagram, replication of the synchronizer element of FIG. 6A in blocks op0–op7, to implement a number of synchronization points, and using arbitration (e.g. round-robin) to select one of the sequence numbers across all blocks, and use of that sequence number to pass to a decoder an instruction to be executed.

Figure 6C:
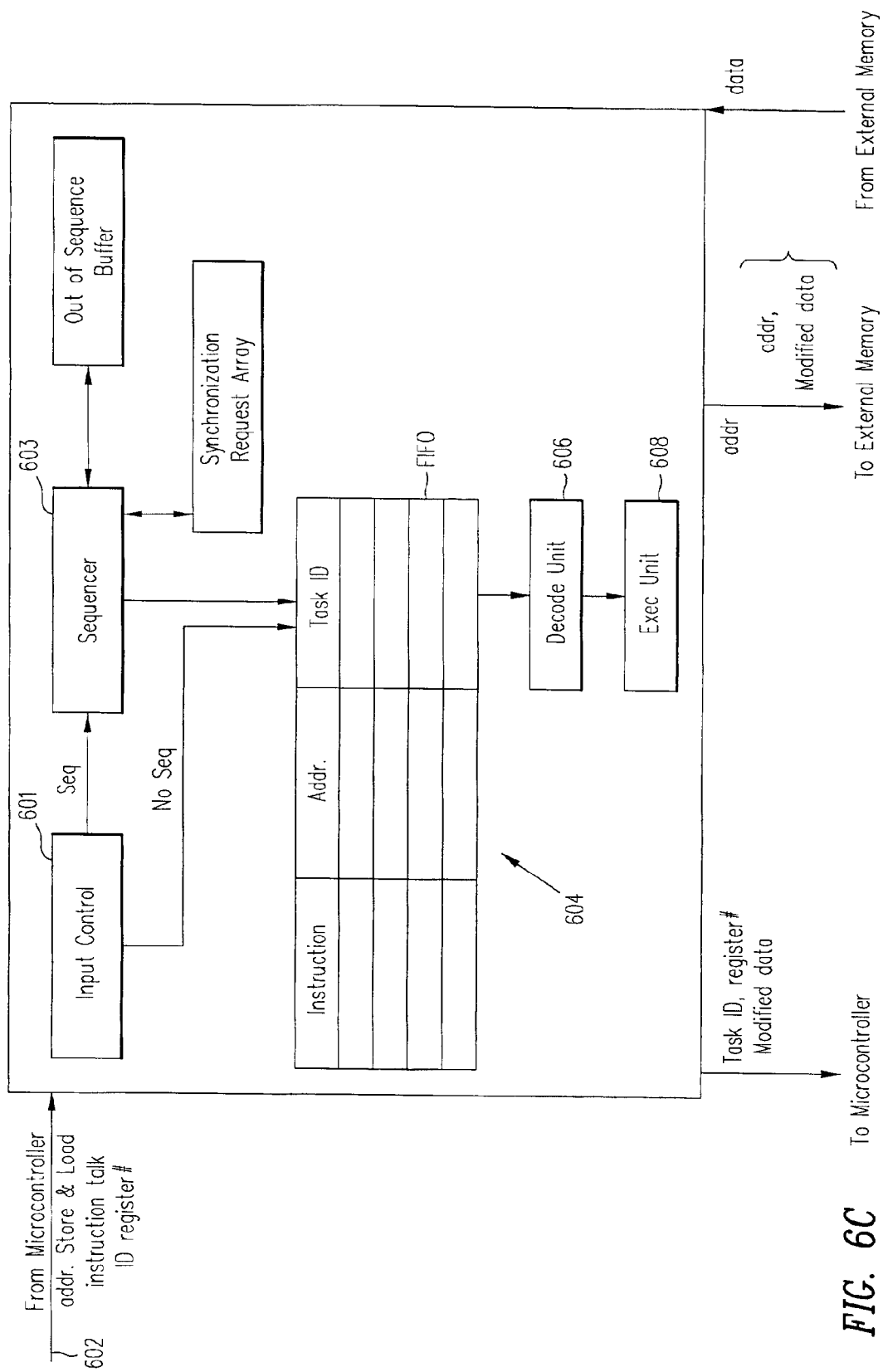
FIG. 6C illustrates, in a high-level block diagram, a memory co-processor of one embodiment, in which a sequencing semaphore of the type illustrated in FIGS. 6A and 6B is implemented.

FIG. 6C illustrates, in a high-level block diagram, a memory co-processor in which a sequencer of the type illustrated in FIGS. 6A and 6B is implemented. A memory co-processor illustrated in FIG. 6C also contains an input control block 601 that directs commands received on a bus 602 either to a sequencer 603 or to a command FIFO 604 that holds various instructions (along with a memory address and a task identifier) for decoding by decode unit 606 and execution by execution unit 608.

Such a decision is made based on the type of command received, e.g. if the command type is not "SPU" (which is an name for the memory co-processor of one embodiment), then the command is written directly to the FIFO. If the command type is "SPU" and if the "enable sequencing" signal (which is in a field in the command that has been received) is inactive then the command is written directly to the FIFO. In all other cases, the command is passed to the sequencer. As noted elsewhere herein, the sequencer buffers commands that are received out of sequence, and after the next command (based on a previously processed command's sequence number) is received, then as many commands as can be issued in sequence are issued to the command FIFO.

FIG. 6C also contains a decode unit 606 that decodes each instruction in the FIFO, and passes the decoded instruction and parameters to the execution unit 608. The execution unit in turn executes the instruction, e.g. performs a read-modify-write operation to read data from memory, change the data based on the specified modify function (such as policing) and writes the data back to memory.

Numerous modifications and adaptations of the embodiments, examples, and implementations described herein will be apparent to the skilled artisan in view of the disclosure.

For example, under certain circumstances, no-need tasks may be allowed to change their decision, e.g. if a needy task that is to be granted access has not yet issued an access request. Moreover, instead of granting access to the shared data to tasks as per sequence number, a re-ordering semaphore of the type described herein may grant access in any order among the tasks, depending on the embodiment. For example, such a re-ordering semaphore may operate in a first-in-first-out manner by granting access first to a task that sends in its synchronization request first. Alternatively, the re-ordering semaphore may grant access to the shared data based on a priority associated with each task, or simply in a round-robin fashion. Moreover, although values of certain sizes are shown in several figures, e.g. FIGS. 6A and 6B, these values are merely exemplary and other values can be used in other implementations.

Numerous such modifications and adaptations of the embodiments described herein are encompassed by the attached claims.

What is claimed is:

1. A method of obtaining access to a shared resource, the method comprising:
   issuing a first declaration indicative of a possible need in future to access the shared resource, and providing a sequence number in said first declaration;
   executing software until access to the shared resource is needed or not needed;
   issuing a request to access the shared resource and providing said sequence number in said request, if access is needed; and
   issuing a second declaration indicative of no need in future to access the shared resource and providing said sequence number in said second declaration;
   wherein the sequence number indicates an order of arrival of packets whose information is being processed by said executing software.

2. The method of claim 1 further comprising:
   enabling sequencing when requesting access; and
   disabling updating of a current pointer indicative of said sequence number.

3. The method of claim 1 further comprising:
   issuing a release to indicate an end to use of the shared resource and providing said sequence number in said release.

4. The method of claim 1 further comprising:
   receiving a grant, subsequent to issuing the request;
   wherein the grant is received in said order of arrival of packets;
   using the shared resource for any length of time, after receiving the grant; and
   issuing a release to indicate an end to use of the shared resource and providing said sequence number in said release, after using the shared resource.

5. The method of claim 1 wherein the sequence number is one of a plurality of sequence numbers, and each sequence number in said plurality is mapped to one of a plurality of locations in an array, and the method further comprises:
   updating a value, at a location in the array for said sequence number, in response to each issuing.

6. The method of claim 2 further comprising:
   issuing a release to indicate an end to use of the shared resource providing said sequence number in said release, and enabling updating of said current pointer.

7. The method of claim 4 further comprising:
   maintaining a pointer unchanged, between said grant and said release;
   wherein said pointer indicates a task that performs said using of the shared resource.

8. The method of claim 4 further comprising:
   suspending a task that performs said issuing of said request to access the shared resource until receipt of said grant;
   wherein said task performs said using of the shared resource only after receipt of said grant.

9. The method of claim 6 further comprising:
   using the shared resource for any length of time between disabling updating and enabling updating.

10. A circuit for accessing a shared resource, the circuit comprising:
    means for issuing a first declaration indicative of a possible need in future to access the shared resource, and for providing a sequence number in said first declaration;
    means for executing software until access to the shared resource is needed or not needed;
    means for issuing a request to access the shared resource and providing said sequence number in said request, if access is needed; and
    means for issuing a second declaration indicative of no need in future to access the shared resource, and for providing said sequence number in said second declaration;
    wherein the sequence number indicates an order of arrival of packets whose information is being processed by said executing software.

11. The circuit of claim 10 further comprising:
    means for enabling sequencing when requesting access; and
    means for disabling updating of a current pointer indicative of said sequence number.

12. The circuit of claim 10 further comprising:
    means for issuing a release to indicate an end to use of the shared resource and providing said sequence number in said release.

13. The circuit of claim 10 further comprising:
    means for receiving a grant;
    means for using the shared resource for any length of time, subsequent to receipt of the grant; and
    means for issuing a release to indicate an end to use of the shared resource and providing said sequence number in said release.

14. The circuit of claim 10 wherein the sequence number is one of a plurality of sequence numbers, and each sequence number in said plurality is mapped to one of a plurality of locations in an array, and the circuit further comprises:
    means for updating a value, at a location in the array for said sequence number, in response to each issuing.

15. The circuit of claim 11 further comprising:

means for issuing a release to indicate an end to use of the shared resource, providing said sequence number in said release, and enabling updating of said current pointer.

16. The circuit of claim 13 further comprising:

means for maintaining a pointer unchanged, between said grant and said release;

wherein said pointer indicates a task that performs said using of the shared resource.

17. The circuit of claim 13 further comprising:

means for suspending a task that performs said issuing of said request to access the shared resource until receipt of said grant;

wherein said task performs said using of the shared resource only after receipt of said grant.

18. The circuit of claim 15 further comprising:

means for using the shared resource for any length of time between disabling updating and enabling updating.

19. A method of obtaining access to a shared resource, the method comprising:

issuing a first declaration indicative of a possible need in future to access the shared resource, and providing a number in said first declaration;

executing software until access to the shared resource is needed or not needed;

issuing a request to access the shared resource and providing said number in said request if access is needed; and issuing a second declaration indicative of no need in future to access the shared resource, and providing said number in said second declaration;

wherein said number indicates an order in which grants are to be issued.

20. The method of claim 19 wherein:

the order is of arrival of packets.

21. The method of claim 19 further comprising:

issuing a release to indicate an end to use of the shared resource and providing said number in said release.

22. The method of claim 19 further comprising:

receiving a grant, subsequent to issuing the request;

wherein the grant is received in said order;

using the shared resource for any length of time, after receiving the grant; and issuing a release to indicate an end to use of the shared resource and providing said number in said release, after using the shared resource.

* * * * *